US012450726B2

(12) United States Patent
Nakamukai et al.

(10) Patent No.: US 12,450,726 B2
(45) Date of Patent: Oct. 21, 2025

(54) INSPECTION DEVICE, METHOD, AND COMPUTER PROGRAM FOR INSPECTION

(71) Applicant: TOYOTA JIDOSHA KABUSHIKI KAISHA, Toyota (JP)

(72) Inventors: Yasunori Nakamukai, Nagoya (JP); Yukiharu Tomita, Toyota (JP); Kazuhiro Arita, Toyota (JP); Takahiko Naitou, Nagoya (JP); Akihito Ito, Inazawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 353 days.

(21) Appl. No.: 18/129,220

(22) Filed: Mar. 31, 2023

(65) Prior Publication Data

US 2023/0316501 A1    Oct. 5, 2023

(30) Foreign Application Priority Data

Apr. 4, 2022 (JP) .................................. 2022-062512

(51) Int. Cl.
*G06T 7/00* (2017.01)
*G06V 10/764* (2022.01)

(52) U.S. Cl.
CPC ............ *G06T 7/001* (2013.01); *G06T 7/0008* (2013.01); *G06V 10/764* (2022.01); *G06T 2200/04* (2013.01); *G06T 2207/10012* (2013.01); *G06T 2207/10024* (2013.01); *G06T 2207/10028* (2013.01); *G06T 2207/30164* (2013.01)

(58) Field of Classification Search
CPC ......... G06T 7/0004; G06T 2207/10024; G06T 2207/10028; G06T 2207/20084; G06T 2207/30164; G06V 10/764; G06V 10/806; G06V 2201/06; G06V 20/64
See application file for complete search history.

(56) References Cited

U.S. PATENT DOCUMENTS

| 5,165,270 | A  | * | 11/1992 | Sansalone | ............ | G01N 29/045 |
| | | | | | | 73/594 |
| 6,707,936 | B1 | * | 3/2004 | Winter | .................... | H01L 22/20 |
| | | | | | | 382/145 |
| 10,055,882 | B2 | * | 8/2018 | Marin | ...................... | G06T 17/20 |
| 10,753,882 | B1 | * | 8/2020 | Mahajan | .................. | H04N 7/18 |

(Continued)

FOREIGN PATENT DOCUMENTS

JP        2020-183876 A    11/2020

*Primary Examiner* — Aaron W Carter
(74) *Attorney, Agent, or Firm* — Dinsmore & Shohl LLP

(57) ABSTRACT

An inspection device includes a processor configured to calculate a first identification index indicating likelihood of each possible state of an object to be inspected regarding a predetermined inspection item by inputting a color image representing the object into a first classifier, the color image being generated by a camera, calculate a second identification index indicating likelihood of each possible state of the object regarding the predetermined inspection item by inputting a depth image representing, for each pixel, the distance to a part of the object represented in the pixel into a second classifier, the depth image being generated by a 3-D camera, and determine the state of the object regarding the inspection item, based on the result of integration of the first identification index and the second identification index.

5 Claims, 5 Drawing Sheets

(56) References Cited

U.S. PATENT DOCUMENTS

| | | | |
|---|---|---|---|
| 2006/0018534 A1* | 1/2006 | Nagata | G06T 7/001 |
| | | | 382/164 |
| 2018/0211373 A1* | 7/2018 | Stoppa | G06T 7/55 |
| 2018/0322623 A1* | 11/2018 | Memo | G06N 3/084 |
| 2019/0096135 A1* | 3/2019 | Dal Mutto | G06F 18/24765 |
| 2019/0108396 A1* | 4/2019 | Dal Mutto | G06V 20/52 |
| 2019/0188846 A1* | 6/2019 | Tamai | G06V 10/7788 |
| 2019/0287237 A1* | 9/2019 | de Bonfim Gripp | G06T 7/64 |
| 2020/0126204 A1* | 4/2020 | Watanabe | G06T 7/136 |
| 2020/0372625 A1* | 11/2020 | Dal Mutto | G06F 18/254 |
| 2021/0200777 A1* | 7/2021 | Kass | G06F 16/24578 |
| 2021/0243344 A1* | 8/2021 | Peng | H04N 23/71 |
| 2021/0334946 A1* | 10/2021 | Buzaglo | G01N 21/956 |
| 2021/0383521 A1* | 12/2021 | Wilson | B31B 50/26 |
| 2022/0165051 A1 | 5/2022 | Tokuyama et al. | |
| 2023/0095525 A1* | 3/2023 | Kalariya | G01N 29/069 |
| | | | 706/12 |
| 2023/0316490 A1* | 10/2023 | Nakamukai | G06V 10/764 |
| | | | 382/141 |
| 2023/0316501 A1* | 10/2023 | Nakamukai | G06V 10/82 |
| | | | 382/154 |
| 2024/0104882 A1* | 3/2024 | Jeong | G06V 10/255 |
| 2024/0338927 A1* | 10/2024 | Rodrigues | G06T 7/33 |
| 2025/0086985 A1* | 3/2025 | Jahanshahi | G06T 7/0006 |
| 2025/0148588 A1* | 5/2025 | Tondulkar | G06T 7/174 |
| 2025/0157020 A1* | 5/2025 | Vorobieva | G06V 10/751 |

* cited by examiner

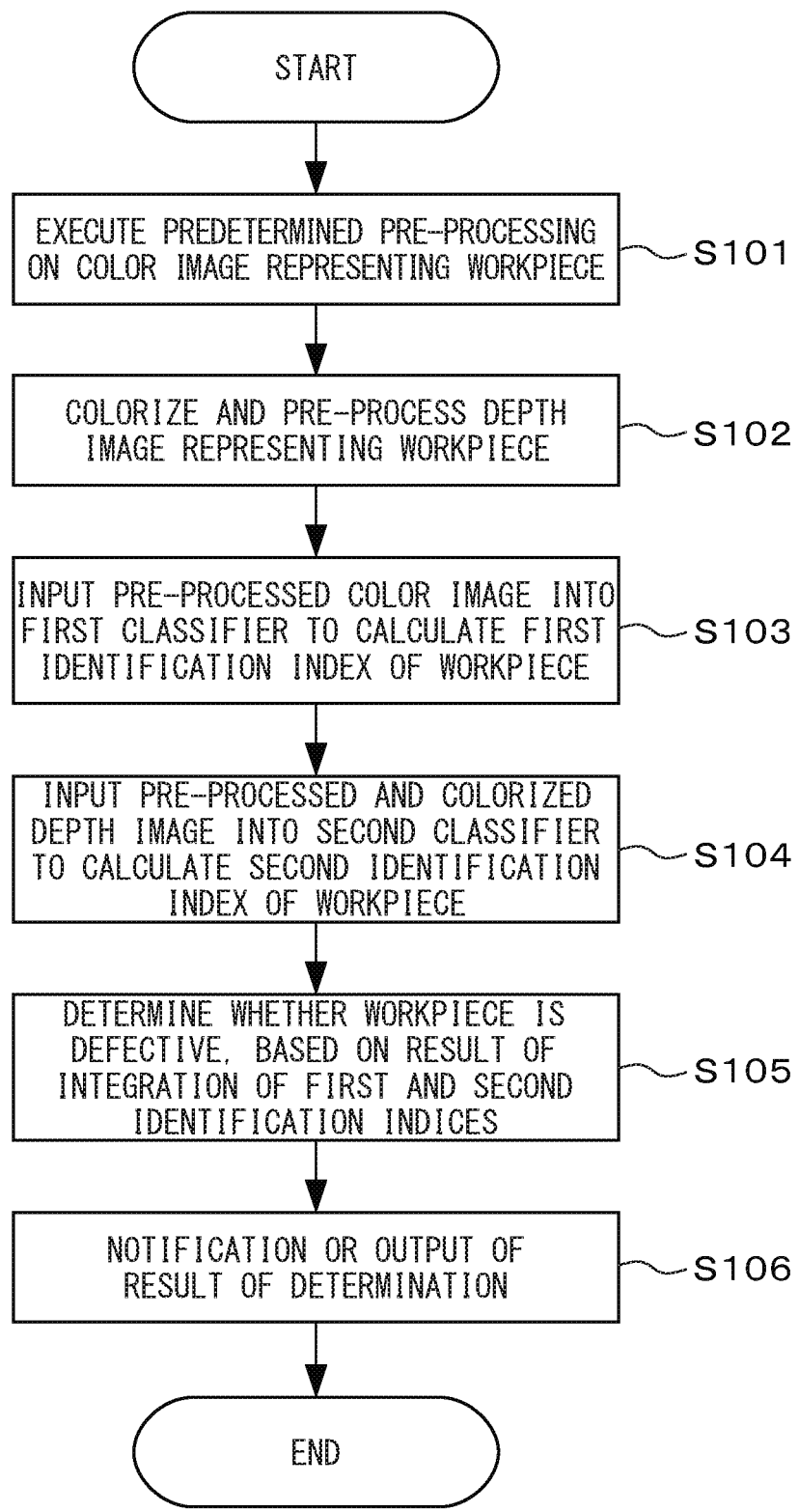

INSPECTION DEVICE, METHOD, AND COMPUTER PROGRAM FOR INSPECTION

CROSS-REFERENCE TO RELATED APPLICATION

This application is a national phase of Japanese Patent Application No. 2022-062512 filed on Apr. 4, 2022, the entire contents of which are herein incorporated by reference.

FIELD

The present disclosure relates to an inspection device, a method, and a computer program for inspection based on, for example, an image and a depth image representing an object to be inspected.

BACKGROUND

A technique to inspect an object, using a two-dimensional color image and a three-dimensional (3-D) image of the object taken with a camera and a 3-D camera, respectively, has been proposed (see Japanese Unexamined Patent Publication JP2020-183876A).

A system for recognizing feature points disclosed in JP2020-183876A executes computations on an image obtained by combining a visible-light image and a 3-D image of a first surface of a workpiece, in accordance with an algorithm made by deep learning to output positional information of feature points in the workpiece.

SUMMARY

The technique described in JP2020-183876A requires a camera and a 3-D camera that generate a visible-light image and a 3-D image, respectively, to be disposed so that pictures of the same surface of a workpiece can be taken simultaneously. However, it may be difficult to dispose a camera and a 3-D camera in such a way, depending on the environment in which the inspection device is disposed.

It is an object of the present disclosure to provide an inspection device that can improve the accuracy of inspection of an object and enhance flexibility in disposition of an imaging unit that generates a color image and a stereoscopic imaging unit that generates a depth image, respectively.

According to an embodiment, an inspection device is provided. The inspection device includes a processor configured to: calculate a first identification index indicating likelihood of each possible state of an object to be inspected regarding a predetermined inspection item by inputting a color image representing the object into a first classifier, the color image being generated by a camera, calculate a second identification index indicating likelihood of each possible state of the object regarding the predetermined inspection item by inputting a depth image representing, for each pixel, the distance to a part of the object represented in the pixel into a second classifier different from the first classifier, the depth image being generated by a 3-D camera, and determine the state of the object regarding the inspection item, based on the result of integration of the first identification index and the second identification index.

In some embodiments, the processor is further configured to colorize the depth image.

In some embodiments, in this case, the first classifier and the second classifier may have the same configuration.

According to another embodiment, a method for inspection is provided. The method includes calculating a first identification index indicating likelihood of each possible state of an object to be inspected regarding a predetermined inspection item by inputting a color image representing the object into a first classifier, the color image being generated by a camera; calculating a second identification index indicating likelihood of each possible state of the object regarding the predetermined inspection item by inputting a depth image representing, for each pixel, the distance to a part of the object represented in the pixel into a second classifier different from the first classifier, the depth image being generated by a 3-D camera; and determining the state of the object regarding the inspection item, based on the result of integration of the first identification index and the second identification index.

According to still another embodiment, a non-transitory recording medium that stores a computer program for inspection is provided. The computer program includes instructions causing a computer to execute a process including calculating a first identification index indicating likelihood of each possible state of an object to be inspected regarding a predetermined inspection item by inputting a color image representing the object into a first classifier, the color image being generated by a camera; calculating a second identification index indicating likelihood of each possible state of the object regarding the predetermined inspection item by inputting a depth image representing, for each pixel, the distance to a part of the object represented in the pixel into a second classifier different from the first classifier, the depth image being generated by a 3-D camera; and determining the state of the object regarding the inspection item, based on the result of integration of the first identification index and the second identification index.

According to the present disclosure, the inspection device has an effect of being able to improve the accuracy of inspection of an object and to enhance flexibility in disposition of the imaging unit that generates a color image and the stereoscopic imaging unit that generates a depth image, respectively.

BRIEF DESCRIPTION OF DRAWINGS

FIG. 5 is an operation flowchart of the inspection process.

DESCRIPTION OF EMBODIMENTS

An inspection device, a method for inspection executed by the inspection device, and a computer program for inspection will now be described with reference to the attached drawings. The inspection device calculates a first identification index indicating likelihood of each possible state of an object to be inspected regarding a predetermined inspection item by inputting a color image representing the object into a first classifier. The inspection device also calculates a second identification index indicating likelihood of each possible state of the object regarding the predetermined inspection item by inputting a depth image representing the object into a second classifier. The inspection device then determines the state of the object regarding the inspection item, based on the result of integration of the first identification index and the second identification index. The first and second classifiers are separately trained in advance so as to calculate the first and second identification indices, respectively. Thus, an imaging unit that generates the color image to be inputted into the first classifier and a stereoscopic imaging unit that generates the depth image to be inputted into the second classifier may take a picture of the object from different directions, and further at different timings. This enhances flexibility in disposition of the imaging unit and the stereoscopic imaging unit. Further, the inspection device uses two types of images, i.e., a color image and a depth image representing an object for inspecting the object, and thus can obtain a more accurate result of inspection.

A depth image is an image in which each pixel has a value corresponding to the distance to a part of an object (in the present embodiment, a workpiece, which is an example of an object to be inspected) represented in the pixel. In a depth image, for example, a pixel of interest has a larger value as the distance to a part of an object represented in the pixel is greater, (in other words, the pixel becomes whiter as the distance to a part of an object represented in the pixel is greater). A depth image may be generated so that each pixel has a smaller value as the distance to a part of an object represented in the pixel is greater. The predetermined inspection item of an object to be inspected may be one related to determination as to whether the object is defective, whether the object is a defective or non-defective product, or whether the object is a foreign object. In the following embodiment, the predetermined inspection item of an object to be inspected by an inspection system is one for determining whether the object is defective; and possible states of the object include a state corresponding to defectiveness and a state corresponding to non-defectiveness.

Figure 1:
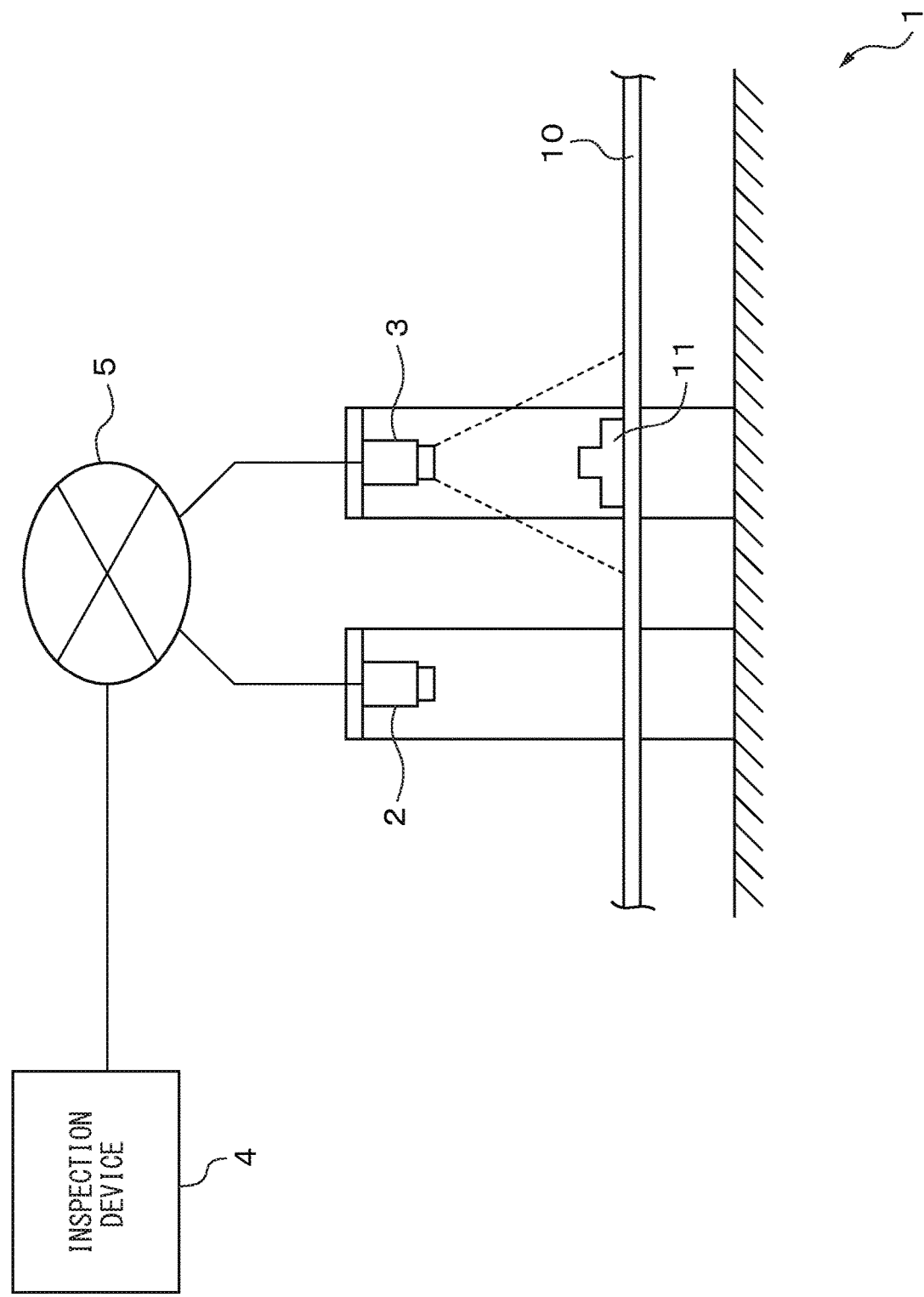
FIG. 1 schematically illustrates the configuration of an inspection system according to an embodiment.

FIG. 1 schematically illustrates the configuration of an inspection system equipped with an inspection device according to an embodiment. The inspection system 1 includes a camera 2, a 3-D camera 3, and an inspection device 4. The camera 2 and the 3-D camera 3 are communicably connected to the inspection device 4 via a communication channel 5. The inspection system 1 determines whether a workpiece 11, which is an example of an object to be inspected, conveyed by a conveyor belt 10 is defective.

The camera 2, which is an example of the imaging unit, is mounted, for example, on a support member that straddles the conveyor belt 10 and oriented downward so that a picture of a workpiece 11 conveyed on the conveyor belt 10 can be taken from above. The camera 2 may be mounted on the support member so as to take a picture of a workpiece 11 from the side or from obliquely above. The camera 2 takes a picture of a workpiece 11 at a timing when the workpiece 11 is conveyed into a capture area of the camera 2, thereby generating a color image representing the workpiece 11. In the present embodiment, a color image generated by the camera 2 is assumed to be represented in an RGB color coordinate system. However, a color image generated by the camera 2 may be represented in another color coordinate system, such as an HSV color coordinate system. The timing when a workpiece 11 is conveyed into the capture area of the camera 2 is notified, for example, via the communication channel 5 by a controller (not illustrated) that controls the conveyor belt 10. Every time a color image representing a workpiece 11 is generated, the camera 2 outputs the generated color image to the inspection device 4 via the communication channel 5.

The 3-D camera 3, which is an example of the stereoscopic imaging unit, is mounted, for example, on a support member that straddles the conveyor belt 10 and is oriented downward so that a picture of a workpiece 11 conveyed on the conveyor belt 10 can be taken from above. The 3-D camera 3 may be mounted on the support member where the camera 2 is mounted or on another support member. In other words, the 3-D camera 3 and the camera 2 may take a picture of a workpiece 11 at different positions. Further, the 3-D camera 3 and the camera 2 may take a picture of a workpiece 11 at different timings. Further, the 3-D camera 3 and the camera 2 may take a picture of a workpiece 11 from different directions.

The 3-D camera 3 may be any of various types that can generate a depth image. For example, the 3-D camera 3 may be a time-of-flight camera. In this case, the 3-D camera 3 can generate a depth image by taking a single picture. Thus the 3-D camera 3 takes a single picture of a workpiece 11 at a timing when the workpiece 11 is conveyed into a capture area of the 3-D camera 3, thereby generating a depth image representing the workpiece 11. The timing when a workpiece 11 is conveyed into the capture area of the 3-D camera 3 is notified, for example, via the communication channel 5 by the controller (not illustrated) that controls the conveyor belt 10. Alternatively, the 3-D camera 3 may be a stereo camera or a structured illumination camera. In the case where the 3-D camera 3 is a stereo camera, when a workpiece 11 is conveyed into the capture area of the 3-D camera 3, individual cameras included in the 3-D camera 3 take a picture of the workpiece 11, thereby generating images. The images generated by the individual cameras are outputted to the inspection device 4 via the communication channel 5. In the case where the 3-D camera 3 is a structured illumination camera, when a workpiece 11 is conveyed into the capture area of the 3-D camera 3, the camera takes multiple pictures while varying the phase of structured light emitted from an illuminating light source included in the 3-D camera 3, thereby generating images. These images are outputted to the inspection device 4 via the communication channel 5.

The inspection device 4 is connected to the camera 2 and the 3-D camera 3 via the communication channel 5. The inspection device 4 determines whether a workpiece 11 is defective, based on a color image of the workpiece 11 received from the camera 2 as well as a depth image of the workpiece 11 or images for generating a depth image thereof, which are received from the 3-D camera 3.

Figure 2:
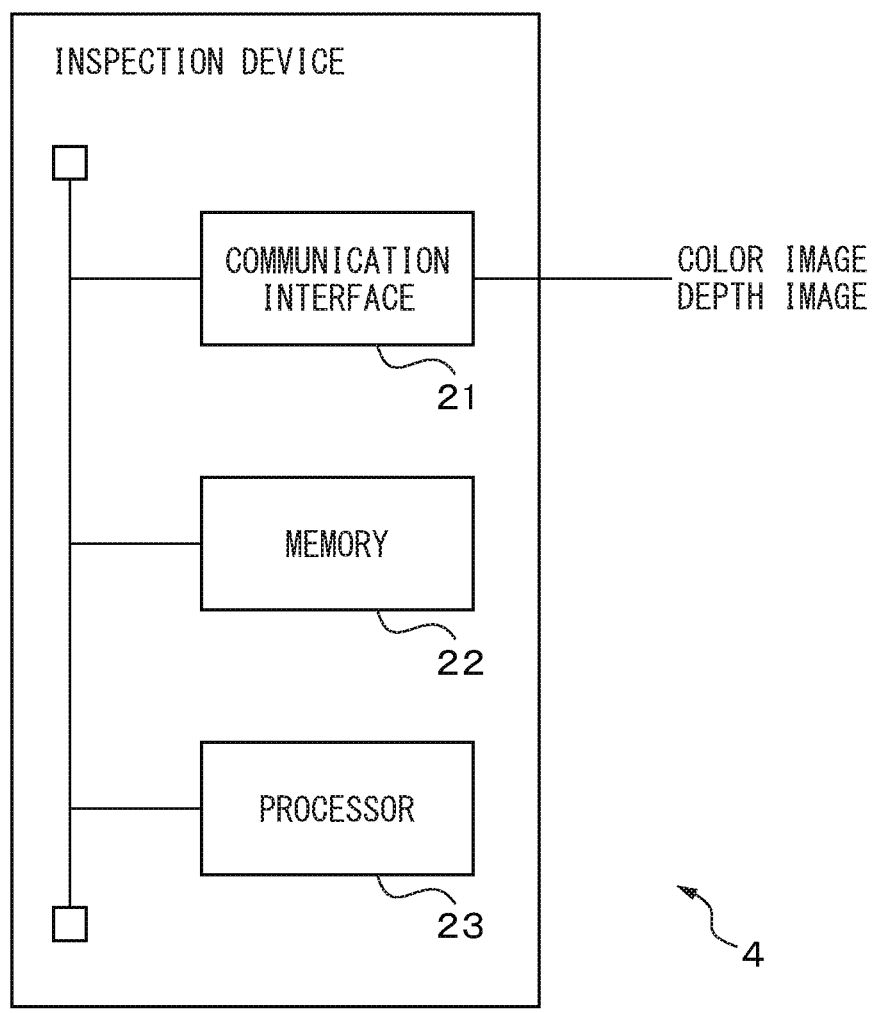
FIG. 2 illustrates the hardware configuration of an inspection device according to the embodiment.

FIG. 2 illustrates the hardware configuration of the inspection device 4. The inspection device 4 includes a communication interface 21, a memory 22, and a processor 23. The inspection device 4 may further include a user interface (not illustrated), such as a keyboard and a display.

The communication interface 21, which is an example of a communication unit, includes, for example, a communication interface for connecting the inspection device 4 to the communication channel 5 and a circuit for executing processing related to transmission and reception of signals via the communication channel 5. The communication interface 21 receives a color image from the camera 2 via the communication channel 5, and passes the color image to the processor 23. The communication interface 21 also receives a depth image or images for generating a depth image from the 3-D camera 3 via the communication channel 5, and passes these images to the processor 23. In addition, the communication interface 21 may output the result of determination whether the workpiece 11 is defective, which is received from the processor 23, to another device (not illustrated) via the communication channel 5.

The memory 22, which is an example of a storage unit, includes, for example, a readable and writable semiconductor memory and a read-only semiconductor memory. The memory 22 may further include a storage medium, such as a semiconductor memory card, a hard disk, or an optical storage medium, and a device for accessing the storage medium.

The memory 22 stores a computer program for an inspection process executed by the processor 23 of the inspection device 4 as well as various parameters and various types of data used in the inspection process. As the various parameters used in the inspection process, the memory 22 stores, for example, sets of parameters for defining the configurations of individual classifiers. In addition, the memory 22 may temporarily store a color image and a depth image representing a workpiece 11 (or images used for generating a depth image). The memory 22 may further store the result of determination as to whether the workpiece 11 is defective.

The processor 23, which is an example of a processing unit, includes, for example, one or more CPUs and a peripheral circuit thereof. The processor 23 may further include an operating circuit for numerical operation or graphics processing. The processor 23 stores a color image of a workpiece 11 received from the camera 2 in the memory 22, and stores a depth image of the workpiece 11 or images for generating a depth image thereof, which are received from the 3-D camera 3, in the memory 22. Further, the processor 23 executes the inspection process on the workpiece 11, based on the color image and the depth image.

Figure 3:
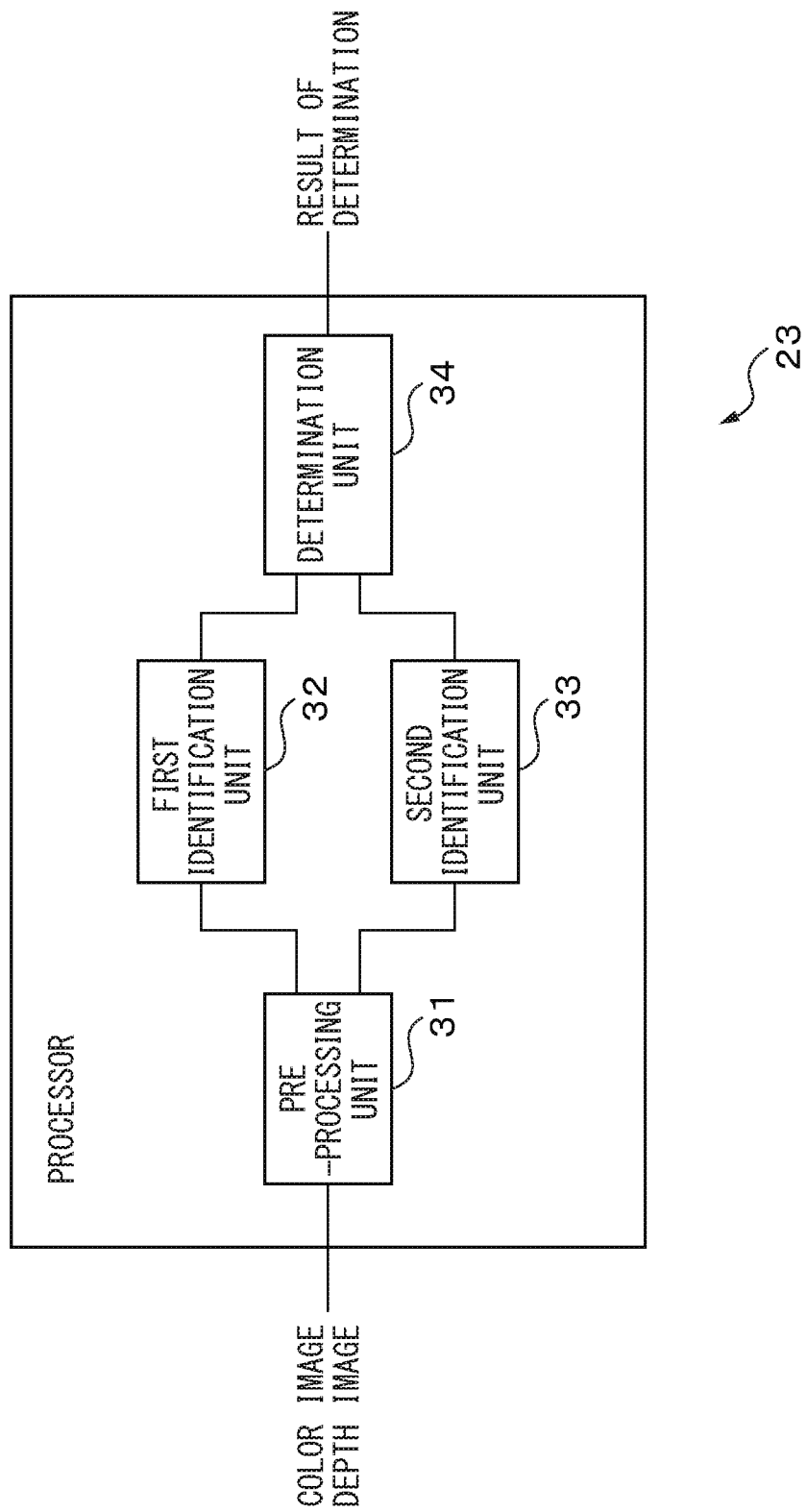
FIG. 3 is a functional block diagram of a processor, related to an inspection process.

FIG. 3 is a functional block diagram of the processor 23, related to the inspection process. The processor 23 includes a pre-processing unit 31, a first identification unit 32, a second identification unit 33, and a determination unit 34. These units included in the processor 23 are functional modules, for example, implemented by a computer program executed by the processor 23. Alternatively, these units may be included in the processor 23 as a dedicated operating circuit.

The pre-processing unit 31 generates a depth image from images for generating a depth image when these images are obtained from the 3-D camera 3.

For example, in the case where the 3-D camera 3 is a stereo camera, the pre-processing unit 31 executes stereo matching between images generated by individual cameras included in the stereo camera, thereby generating a depth image representing a workpiece 11. In the case where the 3-D camera 3 is a structured illumination camera, the pre-processing unit 31 executes a predetermined operation to combine images obtained by irradiating a workpiece 11 with structured light having different phases, thereby generating a depth image representing the workpiece 11.

The pre-processing unit 31 further executes predetermined pre-processing on a color image and a depth image representing a workpiece 11 before input into first and second classifiers. For example, the pre-processing unit 31 standardizes a color image by transforming the values of pixels of the color image in accordance with the following expressions.

$$(R-0.485*255)/(0.299*255)$$

$$(G-0.456*255)/(0.224*255)$$

$$(B-0.406*255)/(0.225*255) \quad (1)$$

R, G, and B denote the values of red, green, and blue components of a pixel of interest, respectively. Each color component of individual pixels of the color image before standardization is assumed to have a value in the range of 0 to 255.

Alternatively, the pre-processing unit 31 may standardize a color image by transforming the values of pixels of the color image in accordance with the following expressions.

$$(R-\mu_R)/\sigma_R$$

$$(G-\mu_G)/\sigma_G$$

$$(B-\mu_B)/\sigma_B \quad (2)$$

R, G, and B denote the values of red, green, and blue components of a pixel of interest, respectively. $\mu_R$, $\mu_G$, and $\mu_B$ denote the averages of red, green, and blue components over the whole color image, respectively. $\sigma_R$, $\sigma_G$, and $\sigma_B$ denote the standard deviations of red, green, and blue components over the whole color image, respectively.

Alternatively, the pre-processing unit 31 may normalize a color image by dividing the color components of each pixel of the color image by a possible maximum (in this example, 255). Alternatively, the pre-processing unit 31 may execute contrast conversion of a color image by converting the values of the color components of individual pixels of the color image in accordance with a predetermined y-curve. Further, the pre-processing unit 31 may apply other pre-processing, such as processing to normalize histograms of the color components, to a color image. Application of such pre-processing to a color image enables the pre-processing unit 31 to reduce variations of color images inputted into a first classifier. This enables the pre-processing unit 31 to indirectly improve the accuracy of identification by the first classifier as to whether the workpiece 11 is defective.

The pre-processing unit 31 applies predetermined coloring processing to a depth image to colorize the depth image. As such coloring processing, the pre-processing unit 31 can use, for example, processing with a predetermined color conversion algorithm by which a whiter pixel becomes redder and a blacker pixel becomes bluer. Alternatively, the pre-processing unit 31 may colorize a depth image by inputting the depth image into a model that has been trained to convert an inputted monochrome image into a color image. As such a model, the pre-processing unit 31 can use a "deep neural network (DNN)" having architecture of a convolutional neural network (CNN) type including multiple convolution layers.

To the colorized depth image, the pre-processing unit 31 applies pre-processing similar to that applied to the color image. For example, the pre-processing unit 31 standardizes the colorized depth image in accordance with expression (1) or (2). Alternatively, the pre-processing unit 31 may normalize the colorized depth image by applying normalization processing like that described above to the colorized depth image. Alternatively, the pre-processing unit 31 may apply other pre-processing like that described above to the colorized depth image. Application of such pre-processing to a depth image enables the pre-processing unit 31 to reduce variations of depth images inputted into a second classifier. This enables the pre-processing unit 31 to indirectly improve the accuracy of identification by the second classifier as to whether the workpiece 11 is defective. In addition, application of coloring processing to a depth image by the pre-processing unit 31 enables use of DNNs having the same configuration as the first and second classifiers.

To the colorized depth image, the pre-processing unit 31 may apply pre-processing different from that applied to the color image. For example, the pre-processing unit 31 may standardize the color image in accordance with one of expressions (1) and (2), and standardize the colorized depth image in accordance with the other of expressions (1) and (2). Alternatively, the pre-processing unit 31 may standardize the color image in accordance with expression (1) or (2), and normalize the colorized depth image by normalization processing like that described above. In this way, the pre-processing unit 31 can execute pre-processing suitable for the individual images by applying different pre-processing to the color image and the colorized depth image.

Alternatively, the pre-processing unit 31 may apply predetermined pre-processing and then coloring processing to a depth image.

The pre-processing unit 31 outputs the pre-processed color image to the first identification unit 32. The pre-processing unit 31 also outputs the pre-processed and colorized depth image to the second identification unit 33.

The first identification unit 32 calculates a first identification index indicating likelihood of each possible state of the workpiece 11 regarding a predetermined inspection item by inputting the pre-processed color image into a first classifier. In the present embodiment, the first classifier calculates confidence scores indicating likelihood of the presence and absence of a defect in the workpiece 11. In the following, a pre-processed color image will be referred to simply as a "color image."

As the first classifier is used a DNN having architecture of a CNN type. More specifically, the DNN used as the first classifier includes, for example, multiple convolution layers that execute a convolution operation, at least one fully-connected layer that executes a fully-connected operation, and an output layer, in order from the input side. The DNN further includes an activation layer that executes an activation operation, such as ReLU or Mish, on the output of each convolution layer and on the output of each fully-connected layer. The DNN may further include at least one pooling layer disposed between two successive convolution layers or on the output of the convolution layer closest to the output. Such a pooling layer may be one that executes max pooling or global average pooling. The output layer of the DNN may be one that executes a softmax operation or a sigmoid operation. The output layer may further include a layer for metric learning, such as SphereFace, CosFace, or ArcFace, closer to the input than the layer that executes a softmax operation or a sigmoid operation. As the first classifier, the first identification unit 32 may use a DNN of another form, e.g., a DNN having architecture of a self-attention network (SAN) type, or a classifier conforming to another machine learning algorithm, such as a support vector machine or AdaBoost.

The first classifier is trained in advance in accordance with a predetermined training algorithm, such as backpropagation, using a large amount of training data including color images representing defective workpieces 11 and color images representing non-defective workpieces 11. This enables the first classifier to relatively accurately identify whether a workpiece 11 represented in an inputted color image is defective.

In the case where the first classifier is a DNN like that described above, the first identification unit 32 may use an existing trained DNN, such as a VGG-16, VGG-19, or EfficientNet, as the classifier. In this case, since the DNN used is trained to a certain extent, transfer learning with a relatively small amount of training data will reduce the computational burden at training and improve the accuracy of identification by the first classifier as to whether the workpiece 11 is defective. In an actual process in particular, it may be difficult to prepare a large amount of training data representing defective workpieces 11, because defective workpieces 11 are rare. However, use of such transfer learning enables improving of the accuracy of identification by the first classifier as to whether the workpiece 11 is defective, even with a small amount of training data.

As the first identification index, the first classifier calculates a confidence score indicating likelihood that the workpiece 11 is defective and a confidence score indicating likelihood that the workpiece 11 is not defective. In particular, in the case where the output layer is configured to execute a softmax operation, the sum of the confidence score of defectiveness and that of non-defectiveness is 1. The first identification unit 32 outputs the first identification index outputted by the first classifier to the determination unit 34.

The second identification unit 33 calculates a second identification index indicating likelihood of each possible state of the workpiece 11 regarding the predetermined inspection item by inputting the pre-processed and colorized depth image into a second classifier. In the present embodiment, the second classifier calculates confidence scores indicating likelihood of the presence and absence of a defect in the workpiece 11. In the following, a pre-processed and colorized depth image inputted into the second classifier will be referred to simply as a "depth image."

As the second classifier is used a classifier similar to that described in relation to the first classifier. Thus the second classifier is also trained in advance in accordance with a predetermined training algorithm, using a large amount of training data including depth images representing defective workpieces 11 and depth images representing non-defective workpieces 11. This enables the second classifier to relatively accurately identify whether a workpiece 11 represented in an inputted depth image is defective.

In particular, a DNN having the same configuration as the first classifier may be used as the second classifier. In the present embodiment, the meaning of two DNNs having the same configuration is that the configurations of layers of the two DNNs and the types of operations of corresponding layers are the same. Thus, for example, weighting factors used for operations of individual layers, which have different values by being trained individually, may differ from each other as long as the configurations of layers of the two DNNs and the types of operations of corresponding layers are the same. For example, the first and second classifiers may each be an individually trained VGG-16, VGG-19, or EfficientNet. In this case, since the DNN used as the second classifier is trained to a certain extent, transfer learning with a relatively small amount of training data will reduce computational burden at training and improve the accuracy of identification by the second classifier as to whether the workpiece 11 is defective. Contrary to the above-described example, the DNN used as the first classifier may be configured by applying transfer learning to the DNN used as the second classifier.

As the second identification index, the second classifier calculates a confidence score indicating likelihood that the workpiece 11 is defective and a confidence score indicating likelihood that the workpiece 11 is not defective, similarly to the first classifier. The second identification unit 33 outputs the second identification index to the determination unit 34.

The determination unit 34 determines whether the workpiece 11 is defective, based on the result of integration of the first and second identification indices. In the present embodiment, the determination unit 34 averages the confidence scores of defectiveness included in the first and second identification indices, and averages those of non-defectiveness included in the first and second identification indices. The determination unit 34 determines the averages obtained regarding defectiveness and non-defectiveness as final confidence scores of defectiveness and non-defectiveness, respectively. For example, assume that the confidence score of defectiveness and that of non-defectiveness included in the first identification index are 0.8 and 0.2, respectively, and that the confidence score of defectiveness and that of non-defectiveness included in the second identification index are 0.6 and 0.4, respectively. In this case, the final confidence score of defectiveness and that of non-defectiveness are calculated at 0.7 and 0.3, respectively.

Alternatively, the determination unit 34 may calculate a weighted average of the confidence scores of defectiveness included in the first and second identification indices, and a weighted average of those of non-defectiveness included in the first and second identification indices. In this case, the weighting factors of the first and second identification indices are set, for example, based on the accuracies of identification of the first and second classifiers measured in advance, respectively. More specifically, when the accuracy of identification of the first classifier is higher than that of the second classifier, the weighting factor of the first identification index is set greater than that of the second identification index. Conversely, when the accuracy of identification of the second classifier is higher than that of the first classifier, the weighting factor of the second identification index is set greater than that of the first identification index.

When the final confidence score of defectiveness is higher than that of non-defectiveness, the determination unit 34 determines that the workpiece 11 is defective. Conversely, when the final confidence score of non-defectiveness is not lower than that of defectiveness, the determination unit 34 determines that the workpiece 11 is not defective. Alternatively, when the final confidence score of defectiveness is higher than a predetermined determination threshold, the determination unit 34 may determine that the workpiece 11 is defective; and when the final confidence score of defectiveness is not higher than the predetermined determination threshold, the determination unit 34 may determine that the workpiece 11 is not defective.

The determination unit 34 notifies a user of the result of determination whether the workpiece 11 is defective, via a user interface (not illustrated). Alternatively, the determination unit 34 may output the result of determination whether the workpiece 11 is defective, to another device via the communication interface 21 and the communication channel 5.

Figure 4:
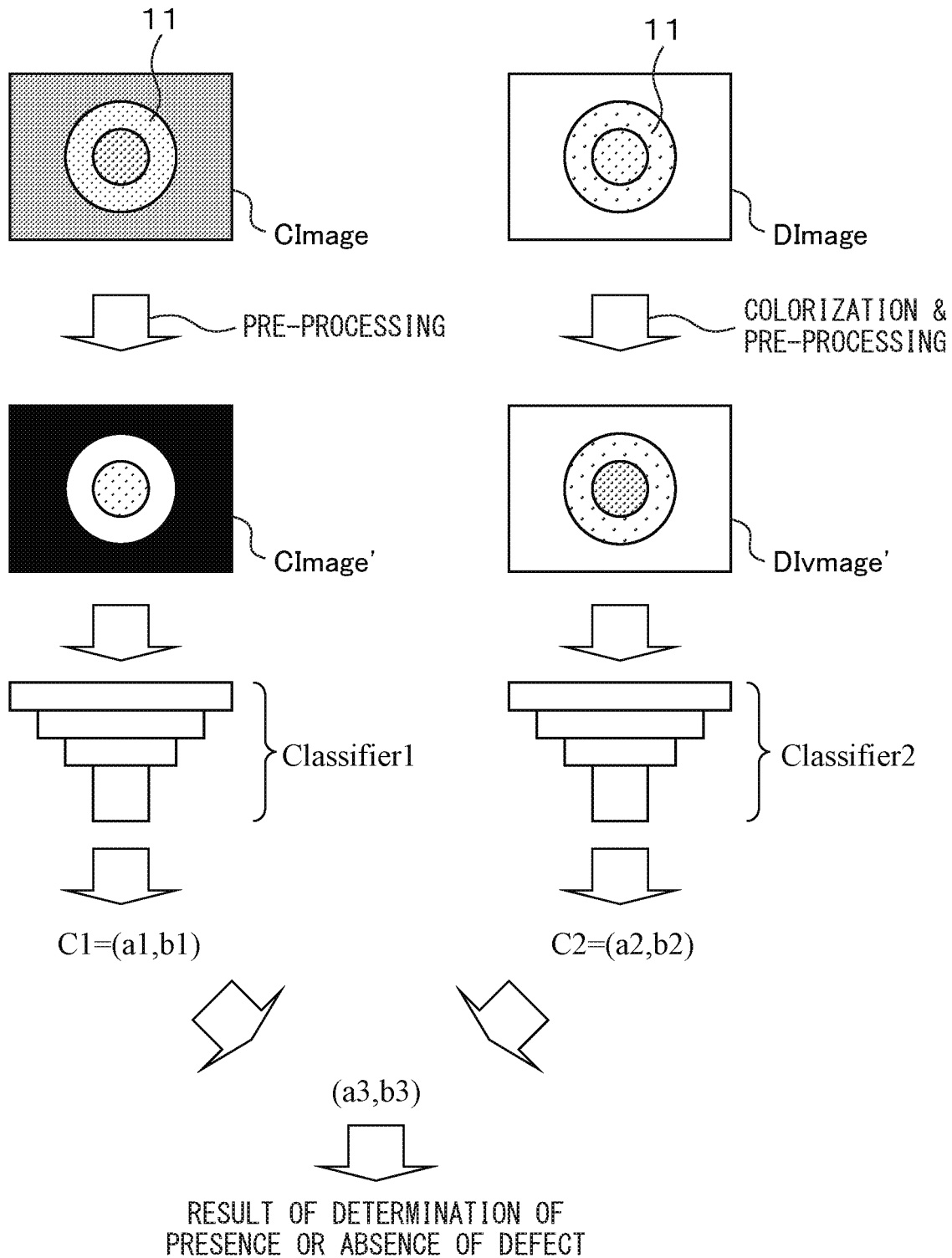
FIG. 4 is a schematic diagram for explaining the inspection process according to the embodiment.

FIG. 4 is a schematic diagram for explaining the inspection process according to the present embodiment. A color image CImage of a workpiece 11 generated by the camera 2 is pre-processed to obtain a color image CImage', which is inputted into the first classifier Classifier1. The first classifier Classifier1 outputs a first identification index C1 including confidence scores (a1, b1) of defectiveness and non-defectiveness in the workpiece 11 represented in the inputted color image CImage'. Meanwhile, a depth image DImage of the workpiece 11 generated by the 3-D camera 3 is colorized and pre-processed to obtain a depth image DImage', which is inputted into the second classifier Classifier2. The second classifier Classifier2 outputs a second identification index C2 including confidence scores (a2, b2) of defectiveness and non-defectiveness in the workpiece 11 represented in the inputted depth image DImage'.

The first and second identification indices C1 and C2 are averaged or weighted-averaged to calculate final confidence scores (a3, b3) of defectiveness and non-defectiveness in the workpiece 11. The presence or absence of a defect in the workpiece 11 is determined on the basis of the final confidence scores (a3, b3) of defectiveness and non-defectiveness in the workpiece 11.

FIG. 5 is an operation flowchart of the inspection process. The processor 23 executes the inspection process in accordance with the operation flowchart described below.

The pre-processing unit 31 of the processor 23 executes predetermined pre-processing on a color image (step S101). The pre-processing unit 31 executes coloring processing and predetermined pre-processing on a depth image (step S102). Processing of steps S101 and S102 may be executed in reverse order or in parallel.

The first identification unit 32 of the processor 23 inputs the pre-processed color image into the first classifier to calculate confidence scores of defectiveness and non-defectiveness in the workpiece 11 as a first identification index (step S103). The second identification unit 33 of the processor 23 inputs the pre-processed and colorized depth image into the second classifier to calculate confidence scores of defectiveness and non-defectiveness in the workpiece 11 as a second identification index (step S104). Processing of steps S103 and S104 may be executed in reverse order or in parallel. Further, processing of steps S101 and S103 and processing of steps S102 and S104 may be executed in parallel.

The determination unit 34 of the processor 23 determines whether the workpiece 11 is defective, based on the result of integration of the first and second identification indices (step S105). The determination unit 34 notifies a user of the result of determination via a user interface, or outputs the result to another device via the communication interface 21 and the communication channel 5 (step S106). The processor 23 then terminates the inspection process.

As has been described above, the inspection device calculates a first identification index by inputting a color image representing an object to be inspected into the first classifier, and calculates a second identification index by inputting a depth image representing the object into the second classifier. The inspection device then obtains the final result of inspection of the object, based on the result of integration of the first and second identification indices. The first and second classifiers are separately trained in advance so as to calculate the first and second identification indices, respectively. Thus the imaging unit, which generates the color image to be inputted into the first classifier, and the stereoscopic imaging unit, which generates the depth image to be inputted into the second classifier, may take a picture of the object from different directions, and further at different timings. This enhances flexibility in disposition of the imaging unit and the stereoscopic imaging unit. Further, the inspection device uses two types of images, i.e., a color image and a depth image representing an object for inspecting the object, and thus can obtain a more accurate result of inspection.

According to a modified example, the pre-processing unit 31 may execute predetermined pre-processing on only a color image or a depth image. Alternatively, the pre-processing unit 31 may omit colorizing of a depth image. Alternatively, the pre-processing unit 31 may omit executing processing other than generation of a depth image. This reduces the amount of computation of the whole inspection process. When the environment of image capture in which the camera 2 and the 3-D camera 3 take a picture of a workpiece 11 is expected to be roughly uniform or when the first and second classifiers are trained taking account of variations in the environment of image capture, the accuracy of inspection can be maintained even without pre-processing. In some embodiments, when colorization of a depth image is omitted, DNNs having different configurations may be used as the first and second classifiers. This is because the structure of a color image (three channels of R, G, and B) inputted into the first classifier differs from that of a depth image (only one channel) inputted into the second classifier.

The computer program for executing the processing of the units included in the processor 23 of the inspection device 4 may be provided in a form recorded on a computer-readable portable storage medium, such as a semiconductor memory, a magnetic medium, or an optical medium.

As described above, those skilled in the art may make various modifications according to embodiments within the scope of the present disclosure.

What is claimed is:

1. An inspection device comprising:
   a processor configured to:
      calculate a first confidence score indicating a likelihood that an object is defective by inputting a color image representing the object into a first classifier, the color image being generated by a camera,
      calculate a second confidence score indicating a likelihood that the object is defective by inputting a depth image representing, for each pixel, the distance to a part of the object represented in the pixel into a second classifier different from the first classifier, the depth image being generated by a 3-D camera, and
      determine a likelihood that the object is defective based on the result of integration of the first confidence score and the second confidence score.

2. The inspection device according to claim 1, wherein the processor is further configured to colorize the depth image.

3. The inspection device according to claim 2, wherein the first classifier and the second classifier have the same configuration.

4. A method for inspection, comprising:
   calculating a first confidence score indicating a likelihood that an object is defective by inputting a color image representing the object into a first classifier, the color image being generated by a camera;
   calculating a second confidence score indicating a likelihood that the object is defective by inputting a depth image representing, for each pixel, the distance to a part of the object represented in the pixel into a second classifier different from the first classifier, the depth image being generated by a 3-D camera; and
   determining a likelihood that the object is defective based on the result of integration of the first confidence score and the second confidence score.

5. A non-transitory recording medium that stores a computer program for inspection, the computer program causing a computer to execute a process comprising:
   calculating a first confidence score indicating a likelihood that an object is defective by inputting a color image representing the object into a first classifier, the color image being generated by a camera;
   calculating a second confidence score indicating a likelihood that the object is defective by inputting a depth image representing, for each pixel, the distance to a part of the object represented in the pixel into a second classifier different from the first classifier, the depth image being generated by a 3-D camera; and
   determining a likelihood that the object is defective based on the result of integration of the first confidence score and the second confidence score.

* * * * *